US010103867B2

(12) United States Patent
Da

(10) Patent No.: US 10,103,867 B2
(45) Date of Patent: Oct. 16, 2018

(54) METHODS, APPARATUSES AND SYSTEMS FOR ENHANCING MEASUREMENT GAP IN SYNCHRONIZED NETWORKS

(71) Applicant: Alcatel-Lucent USA Inc., Murray Hill, NJ (US)

(72) Inventor: Ren Da, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 116 days.

(21) Appl. No.: 14/684,656

(22) Filed: Apr. 13, 2015

(65) Prior Publication Data

US 2016/0301517 A1 Oct. 13, 2016

(51) Int. Cl.
H04J 3/06 (2006.01)
H04L 7/00 (2006.01)
H04L 7/04 (2006.01)
H04W 56/00 (2009.01)
H04W 24/10 (2009.01)

(52) U.S. Cl.
CPC .......... *H04L 7/0037* (2013.01); *H04L 7/0012* (2013.01); *H04L 7/04* (2013.01); *H04W 24/10* (2013.01); *H04W 56/0015* (2013.01)

(58) Field of Classification Search
CPC .................................................. H04L 7/0037
USPC ......................................................... 370/350
See application file for complete search history.

(56) References Cited

U.S. PATENT DOCUMENTS

2003/0085837 A1* 5/2003 Abraham ............. G01S 19/235 342/357.64
2010/0208674 A1* 8/2010 Lee ................... H04W 36/0088 370/329
2012/0264476 A1* 10/2012 Kleinhenz ............. H04L 1/0026 455/517
2014/0314072 A1* 10/2014 Awad ...................... H04L 5/001 370/350
2015/0043545 A1 2/2015 Cheng et al.
2015/0092578 A1 4/2015 Ingale et al.
2015/0245235 A1* 8/2015 Tang ................. H04W 36/0088 370/252

(Continued)

FOREIGN PATENT DOCUMENTS

WO WO-2008085952 A1 7/2008

OTHER PUBLICATIONS

ETSI TS 136 133 V9.3.0 (Apr. 2010) *Technical Specification* LTE; Evolved Universal Terrestrial Radio Access (E-UTRA); Requirements for support of radio resource management (3GPP TS 36.133 version 9.3.0 Release 9), pp. 1-363.

(Continued)

*Primary Examiner* — Mang Yeung
*Assistant Examiner* — Peter G Solinsky
(74) *Attorney, Agent, or Firm* — Harness, Dickey, & Pierce, P.L.C.

(57) ABSTRACT

In one example embodiment, the method includes determining, by a first device, a timing of a primary synchronization signal and a secondary synchronization signal to be transmitted by a second device, determining, by the first device, a timing of a measurement gap for a user equipment served by the first device, the measurement gap being a period of time during which the user equipment searches for the primary and secondary synchronization signals from the second device, and instructing, by the first device, the user equipment to search for the primary and secondary synchronization signals from the second device at the determined timing of the measurement gap.

20 Claims, 7 Drawing Sheets

(56) References Cited

U.S. PATENT DOCUMENTS

| | | | | |
|---|---|---|---|---|
| 2015/0296397 A1* | 10/2015 | Dural | ............... | H04W 24/10 370/252 |
| 2016/0073366 A1* | 3/2016 | Ng | ............... | H04W 56/001 370/329 |
| 2016/0142981 A1* | 5/2016 | Yi | ............... | H04J 11/0069 455/522 |
| 2016/0157116 A1* | 6/2016 | Zhang | ............... | H04W 48/16 370/252 |
| 2016/0183173 A1* | 6/2016 | Harada | ............... | H04W 48/12 455/434 |
| 2016/0219453 A1* | 7/2016 | Harada | ............... | H04W 52/346 |
| 2016/0248533 A1* | 8/2016 | Li | ............... | H04J 11/0086 |
| 2016/0302098 A1* | 10/2016 | Gheorghiu | ............... | H04W 24/10 |
| 2017/0048812 A1* | 2/2017 | Da | ............... | H04W 56/004 |

OTHER PUBLICATIONS

RP-150515, "New SI Proposal: Measurement Gap Enhancement," Intel Corporation, 3GPP TSG RAN Meeting #67, Shanghai, China, Mar. 9-12, 2015, pp. 1-8.

ETSI TS 136 211 V10.3.0 (Oct. 2011) LTE; Evolved Universal Terrestrial Radio Access (E-UTRA); Physical channels and modulation (3GPP TS 36.211 version 10.3.0 Release 10), pp. 1-105.

ETSI TS 136 213 V8.8.0 (Oct. 2009)*Technical Specification* LTE; Evolved Universal Terrestrial Radio Access (E-UTRA); Physical layer procedures (3GPP TS 36.213 version 8.8.0 Release 8), pp. 1-79.

International search report and written option dated Jul. 14, 2016.

Panasonic "Discussion on small cell discovery Issues," 3GPP TSG RAN WG1 Meeting #73 Fukuoka, Japan, May 20-24, 2013, pp. 1-2.

"LTE: Evolved Universal Terrestrial Radio Access (E-UTRA); Requirements for support of radio resource management (3GPP TS 36.133 version 12.7.0 Release 12)," Technical Specification, European Telecommunications Standards Institute 9ETSI), 650, Route Des Lucioles; F-06921 Sophia-Antipolis; France vol. 3GPP RAN 4, No. V12.7.0, Apr. 3, 2015, pp. 1-1015.

Office Action and Search Report dated May 10, 2017 for Taiwan Application No. 105109566.

International Preliminary Report for Application No. PCT/US2016/026884 dated Oct. 26, 2017.

U.S. Appl. No. 14/826,696, filed Aug. 14, 2015.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 3A

| UL/DL Configuration | Subframe N | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 3B

METHODS, APPARATUSES AND SYSTEMS FOR ENHANCING MEASUREMENT GAP IN SYNCHRONIZED NETWORKS

BACKGROUND

In communication networks such as Long Term Evolution (LTE) networks (e.g., LTE E-UTRAN networks), a measurement gap length is defined for a user equipment (UE) to identify and measure signals from base stations associated with carriers other than the carrier associated with a base station currently servicing the UE. Such signals may be transmitted on a different frequency channel than a frequency channel on which the UE communicates with the base station that currently serves the UE. This process may be referred to as identifying and searching inter-frequency and/or inter-radio access technology (RAT) cells.

According to the current standard as defined in 3GPP TS 136.133 V12.7.0 (2015-03), a UE is configured with one of the two measurement gap patterns: either with measurement gap repetition periods (MGRPs) of 40 ms or with MGRPs of 80 ms. During a MGRP, for a duration equal to a measurement gap length, the UE may perform the above identifying and searching for inter-frequency and/or inter-RAT cells. The measurement gap length is set to 6 ms (i.e., 6 subframes). During the measurement gap length, the UE cannot transmit any data and is not expected to tune its receiver on any of the E-UTRAN carrier frequencies of base station currently serving the UE. Therefore, for the duration of the measurement gap length, the interruption on data transmission between the UE and the base station serving the UE is at least 6 ms out of every 40 ms or every 80 ms, depending on the measurement gap pattern configuration.

However, in reality the interruption on the data transmission experienced by the UE may extend beyond the above described measurement gap length. FIG. 1 illustrates the effective interruption in frequency division duplex (FDD) downlink data transmission between a user equipment and a base station, when the user equipment is configured with a measurement gap pattern.

As shown in FIG. 1, an assumption is made that the measurement gap length 100 starts at the subframe n for 6 ms, thus covering subframes n to n+5. For a downlink (DL) Physical Downlink Shared Channel (PDSCH) transmission at a subframe m from the base station (BS) to the UE, the UE needs to send the HARQ ACK/NACK back to the BS on the uplink (UL) subframe m+4 in order to inform the BS of whether the UE has received the DL subframe m correctly or not.

However, for DL subframes m, where m={n−4, n−3, n−2, n−1}, the corresponding UL subframes m+4 falls into one of the subframes n, n+1, n+2 and n+4, all of which fall within the measurement gap length 100. Therefore, the UE will not be able to send HARQ ACK/NACK back to the BS (indicated in FIG. 1 using dashed lines with an "X" mark on each of the dashed lines), and the BS will not know whether the UE has received the downlink (DL) subframe package correctly for subframe m={n−4, n−3, n−2, n−1}. Accordingly, in addition to subframes corresponding to the measurement gap 100, the subframes m={n−4, n−3, n−2, n−1} are not suitable for sending DL packages to the UE (shown as the shaded subframes n−4 to n+5 in FIG. 1). This effectively extends the interruption in FDD downlink data transmission from 6 subframes (6 ms) to 10 subframes (10 ms).

FIG. 2 illustrates the effective interruption in time division duplex (TDD) downlink data transmission between a user equipment and a base station, when the user equipment is configured with a fixed measurement gap pattern.

For TDD DL data transmission, the impact of the measurement gap length 200 on data transmission interruption for the UE depends on the UL/DL configuration as well as a measurement gap offset. FIG. 3A illustrates the TDD Uplink-Downlink configurations table and FIG. 3B illustrates the TDD Downlink association set table, as defined by Table 4.2-2 in 3GPP TS 136.211 V12.5.0 (2015-03) and Table 10.1.3.1-1 in 3GPP TS 136.213 V12.5.0 (2015-03), respectively.

Referring to FIGS. 3A and B, an assumption is made that the UP/DL configuration 2 is chosen. Furthermore, an assumption is made that a measurement gap offset is equal to 1. In FIG. 3A, "D" denotes a downlink subframe reserved for downlink transmissions, "U" denotes an uplink subframe reserved for uplink transmissions and "S" denotes a special subframe with the three parts: DwPTS, GP and UpPTS. DwPTS may be used for DL transmission, GP is safeguard period, and UpPTS may be used for UL transmission. As shown in FIG. 3A, for configuration 2, subframes 1 and 6 are special subframes that contains safeguard period (GP) for switching between UP and DL transmission every 5 ms.

As shown in FIG. 3B, for HARQ ACK/NACK to be sent back to the BS in subframes 2 and 7, the DL PDSCH transmission from the BS to the UE would have to take place in $4^{th}$, $6^{th}$, $7^{th}$ and $8^{th}$ subframe preceding subframes 2 and 7. Note that the $6^{th}$ preceding subframe corresponds to a special subframe, where the DL PDSCH transmission from the BS to the UE may take place only in the field DwPTS.

Referring back to FIG. 2, assume that the measurement gap length 200 starts at subframe n(=1) for 6 subframes (6 ms) to subframe n+6(=7). According to configuration 2, the UL transmission of HARQ ACK/NACK in subframes n+1 (corresponding to the $2^{nd}$ subframe discussed above) fall within the measurement gap length 200, which results in the interruption to DL PDSCH transmission in subframes n−3, n−5, n−6, and n−7.

Furthermore, 3GPP TS 36.133 V12.7.0 (2015-03) defines that if a subframe before the first subframe of the measurement gap length 200 is a DL subframe, transmission on the UL subframe immediately after the end of the measurement gap length 200 is not allowed. Thus, the UL transmission of HARQ ACK/NACK in subframes n+6 (corresponding to the $7^{th}$ subframe discussed above) is not allowed, which in turn results in the interruptions to DL PDSCH transmission in subframes n−1 and n−2.

Therefore, in the TDD DL data transmission, in addition to subframes corresponding to the measurement gap 200, no DL transmission is scheduled on subframes n−7 to n−1. Accordingly, the effective interruption in DL data transmission for the UE extends from within the measurement gap length 200 of 6 subframes (n to n+5) to additionally include the 7 subframes before the start of the measurement gap length 200 (n−7 to n−1), as shown in FIG. 2.

In summary, the effective length of interruption in data transmission for the UE extends beyond the measurement gap length, according to the current state of the art.

SUMMARY

At least one example embodiment relates to a method for determining a length and timing of a measurement gap for a user equipment to search for synchronization signals transmitted from base stations other than the base station currently serving the user equipment.

In one example embodiment, the method includes determining, by a first device, a timing of a first synchronization signal and a second synchronization signal to be transmitted by a second device, determining, by the first device, a timing of a measurement gap for a user equipment served by the first device, the measurement gap being a period of time during which the user equipment searches for the first and second synchronization signals, and instructing, by the first device, the user equipment to search for the first and second synchronization signals at the determined timing of the measurement gap.

In yet another example embodiment, the method further includes receiving from the user equipment, a duration of time required by the user equipment to successfully search for the first and second synchronization signals, wherein the determining the timing of the measurement gap determines the timing of the measurement gap based on the duration of time received from the user equipment.

In yet another example embodiment, the method further includes determining the duration of time based on an amount of time for the user equipment to perform radio frequency tuning and complete preparation for performing the search for the first and second synchronization signals.

In yet another example embodiment, if the amount of time is less than a threshold, the determining determines the duration of time to be equal to a first value, and if the amount of time is greater than the threshold, the determining determines the duration of time to be equal to a second value, the second value being greater than the first value.

In yet another example embodiment, the first value is 1 ms, and the second value is 2 ms.

In yet another example embodiment, the first device serves the user equipment on a first frequency channel that is different from a second frequency channel on which the second device is to transmit the first and second synchronization signals.

In yet another example embodiment, the determining determines the timing of the first synchronization signal and the second synchronization signal based on synchronized timing of the first device, the second device and the user equipment.

In yet another example embodiment, no data transmission is performed between the user equipment and the second device during the measurement gap.

In yet another example embodiment, the first synchronization signal is a primary synchronization signal (PSS) associated with the second device and the second synchronization signal is a secondary synchronization signal (SSS) associated with the second device.

At least one example embodiment relates to a device configured to determine a length and timing of a measurement gap for a user equipment to search for synchronization signals transmitted from base stations other than the base station currently serving the user equipment.

In one example embodiment, the device includes a memory including computer-readable instructions and a processor. The processor is configured to execute the computer-readable instructions to determine a timing of a first synchronization signal and a second synchronization signal to be transmitted by an additional device, determine a timing of a measurement gap for a user equipment served by the device, the measurement gap being a period of time during which the user equipment searches for the first and second synchronization signals transmitted, and instruct the user equipment to search for the first and second synchronization signals at the determined timing of the measurement gap.

In yet another example embodiment, the execution of the computer-readable instructions by the processor further causes the processor to receive from the user equipment, a duration of time required by the user equipment to successfully search for the first and second synchronization signals, and determine the timing of the measurement gap based on the duration of time received from the user equipment.

In yet another example embodiment, the user equipment is configured to determine the duration of time based on an amount of time for the user equipment to perform radio frequency tuning and complete preparation for performing the search for the first and second synchronization signals.

In yet another example embodiment, if the amount of time is less than a threshold, the user equipment determines the duration of time to be equal to a first value, and if the amount of time is greater than the threshold, the user equipment determines the duration of time to be equal to a second value, the second value being greater than the first value.

In yet another example embodiment, the first value is 1 ms, and the second value is 2 ms.

In yet another example embodiment, the device is a base station serving the user equipment on a first frequency channel, and the additional device is an additional base station operating on a second frequency channel that is different from the first frequency channel.

In yet another example embodiment, the device, the additional device and the user equipment are part of a synchronized LTE network.

In yet another example embodiment, the execution of the computer-readable instructions by the processor, causes the processor to determine the timing of the first synchronization signal and the second synchronization signal based on synchronized timing of the first device, the second device and the user equipment.

In yet another example embodiment, the first synchronization signal is a primary synchronization signal (PSS) associated with the second device and the second synchronization signal is a secondary synchronization signal (SSS) associated with the second device.

At least one example embodiment relates to a system configured to determine a length and timing of a measurement gap for a user equipment to search for synchronization signals transmitted from base stations other than the base station currently serving the user equipment.

In one example embodiment, the system includes a user equipment and a first device configured to transmit a first synchronization signal and a second synchronization signal. The system further includes a second device serving the user equipment, the second device configured to determine a timing of the first synchronization signal and the second synchronization signal to be transmitted by the first device, determine a timing of a measurement gap for the user equipment, the measurement gap being a period of time during which the user equipment searches for the first and second synchronization signals, and instruct the user equipment to search for the first and second synchronization signals at the determined timing of the measurement gap.

BRIEF DESCRIPTION OF THE DRAWINGS

Example embodiments will become more appreciable through the description of the drawings, which are not limiting of example embodiments, in which:

FIG. 3A illustrates the TDD Uplink-Downlink configurations;

FIG. 3B illustrates the TDD Downlink association set;

DETAILED DESCRIPTION OF EXAMPLE EMBODIMENTS

Figure 1:
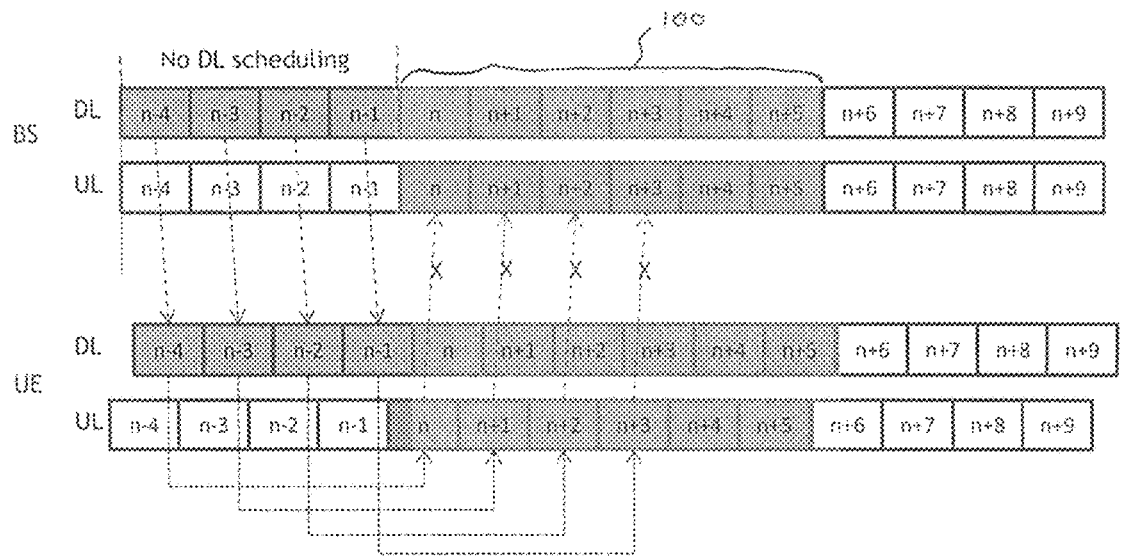
FIG. 1 illustrates the effective interruption in frequency division duplex (FDD) downlink data transmission between a user equipment and a base station, when the user equipment is configured with a fixed measurement pattern.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

As described in the Background Section, a UE may be configured with a measurement gap length within a MGRP (e.g., 6 ms within a MGRP of 40 ms or 80 ms). The measurement gap length may also be referred to as simply the measurement gap, throughout the disclosure. During the 6 ms measurement gap, data transmission between the UE and a base station serving the UE is interrupted. As described in the Background Section, the effective length of interruption in data transmission is longer than the measurement gap length.

As described in the Background Section, the measurement gap length is set at 6 ms according to Table 8.1.2.1-1 in 3GPP TS 36.133, V12.7.0 (2015-03) Release 12; "E-UTRA: Requirements For Support of Radio Resource Management". The reason for selecting the measurement gap length of 6 ms is that the periodicity of LTE primary synchronization signal (PSS) and the secondary synchronization signal (SSS) is 5 ms, and the UE performs blind inter-frequency search for the PSS/SSS, i.e., searching for PSS/SSS from another frequency channel associated with another base station. For performing the blind inter-frequency PSS/SSS search, the UE needs at least a 5 ms search window in order to guarantee one PSS/SSS subframe falling into the search window. The 6 ms gap length accounts for the 5 ms searching window and 1 ms additional time for the UE to perform radio frequency (RF) switching between the frequency channel associated with a base station that currently serves the UE and another frequency channel associated with another base station.

The PSS/SSS signals are synchronization signals transmitted by the other base station and detectable by the UE. Before a UE is to switch to a cell that is associated with a different carrier than the cell with which the UE currently communicates, the UE is to search for and detect the PSS/SSS signals (during an interval equal to the measurement gap length) transmitted by the other base station, obtain the appropriate network information for the new cell and thereafter switch to (may also be referred to as camp on) the new cell. During a period equal to the measurement gap length, the UE searches and identifies the PSS/SSS signals.

Example embodiments described hereinafter, provide a shorter measurement gap length and reduce the interruption in data transmission for a UE due to the measurement gap length.

Figure 4:
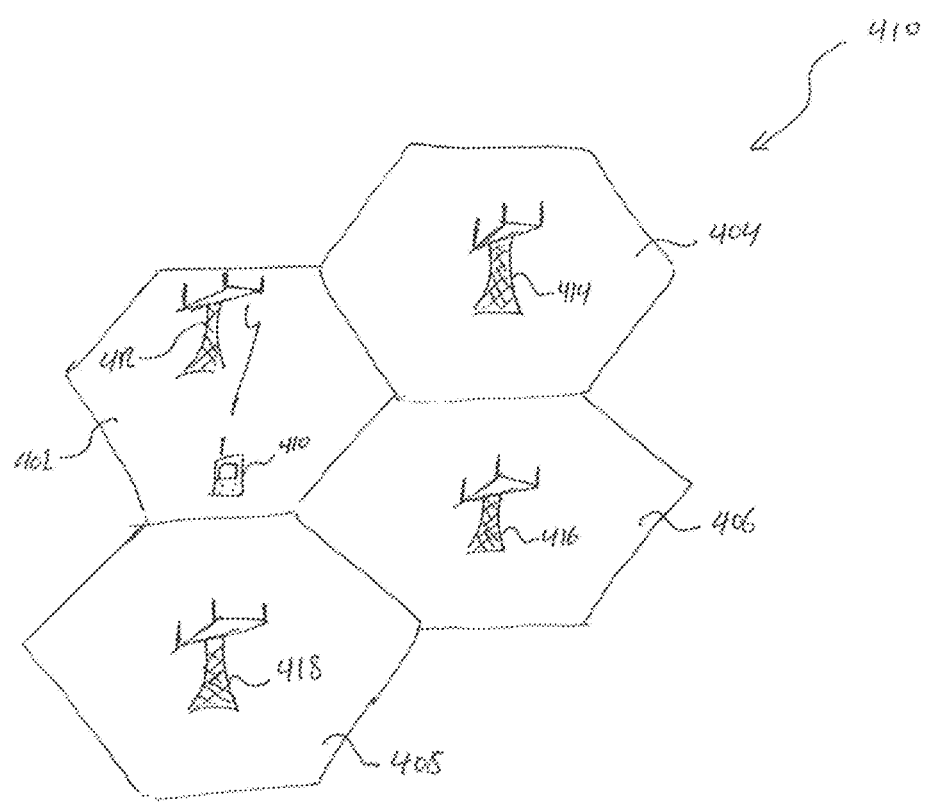
FIG. 4 illustrates a communication system, according to an example embodiment.

FIG. 4 illustrates a communication system, according to an example embodiment. As shown in FIG. 401, a system 401 may be a communication network. The communication network 401 may be a wireless communication network. While the example embodiments are described with respect to the communication network 401 being a synchronized LTE wireless communication network, the communication network 401 may be any other type of synchronized communication network that transmit period synchronized signals.

The communication network 401 may have a variety of cells such as cells 402, 404, 406 and 408. Each of the cells 402, 404, 406 and 408 may have one or more BSs associated therewith generally providing wireless services within the geographical area associated with cell. As shown in FIG. 4, cell 402 has BS 412 associated therewith. Cell 404 has BS 414 associated therewith. Cell 406 has BS 416 associated therewith and Cell 408 has BS 418 associated therewith. Each of the BS 412, 414, 416 and 418 may be an e-NodeB, a small cell base station or any other type of base station that is compatible with the communication network 401.

There may be one or more UEs 410 in cell 402 that communicate with the BS 412. The UE 410 may be any type of device capable of establishing communication with the BS 402 including, but not limited to, a cellular phone, a PDA, a tablet, a computer, etc. The number of cells, base stations and UEs of a communication network are not limited to that shown in FIG. 4 but may include any number of cells, base stations and UEs.

The UE 402 may communicate with the BS 412 over a given frequency channel. However, as the UE 410 moves around within the cell 402, close to boundaries of neighboring cells (e.g., cells 404, 406 or 408 in FIG. 4), or moves from one cell to another, the UE 410 may be able to switch cells and communicate with BS of the neighboring cells. Accordingly, periodically and as is known in the art, the UE 410 may search and identify other base stations to which the UE 410 can switch from the BS 412 that currently serves the UE 410 (base stations that belong to another carrier that is different from the carrier associated with the BS 412 currently serving the UE 410). As described above, before the UE 410 can switch to (e.g., camp on) any other one of the cells 404, 406 or 408, the UE 410 needs to detect the PSS/SSS signals transmitted by one or more of the BSs 414, 416 or 418 of the cells 404, 406 or 408, respectively.

Furthermore, because the communication network 401 is a synchronized communication network, the timings of the BS 412, BS 414, BS 416 and BS 418 are synchronized and each of the BS 412, BS 414, BS 416 and BS 418 is aware of the timing at which the other ones of the BS 412, BS 414, BS 416 and BS 418 transmit their associated PSS/SSS signals. Accordingly, a base station that currently serves a UE (e.g., BS 412 that currently serves the UE 410) is aware of the timing at which each of the BS 414, BS 416 or BS 418 transmit their associated PSS/SSS signals. BS 412 may then configure the UE 410 with a measurement gap length that overlaps in time with a timing of transmission of the PSS/SSS signals by one or more of the BSs 414, 416 or 418. Accordingly, the measurement gap length may be shortened and the interruption in data transmission for the UE 410 may be reduced.

Figure 5:
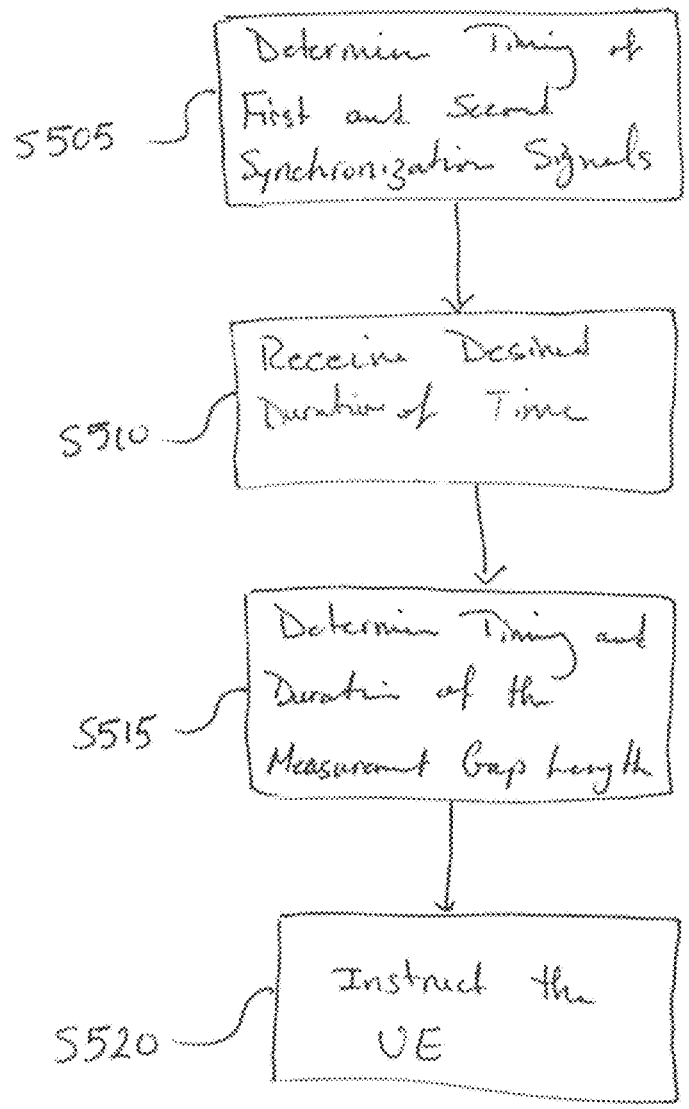
FIG. 5 illustrates a method of determining a length and timing of a measurement gap, according to an example embodiment.

FIG. 5 illustrates a method of determining a length and timing of a measurement gap, according to an example embodiment.

With reference to FIGS. 4 and 5, at S505 and assuming that the UE 410 may be close to or moving toward cell 408 (BS 418 belongs to another carrier that operates over a different frequency band than BS 412), the BS 412 determines the timing of the PSS (first synchronization signal) and SSS (second synchronization signal) to be transmitted by the BS 418.

In one example embodiment, the communication network 401 is a synchronized communication network and therefore the timings of the BS 412 and the BS 418, are synchronized. In one example embodiment, when the BS 412 and the BS 418 are the same type base station that are part of a LTE system (e.g., both are either FDD based or TDD based), the transmission of PSS/SSS signals by BS 412 and BS 418 are synchronized. Accordingly, by knowing the timing of transmission of PSS/SSS signals by the BS 412, the BS 412 determines the timing at which the PSS/SSS signals are to be transmitted by BS 418 (or any of the other ones of the BSs 414 and 416 in the network 401). In other words, the timing of transmission of PSS/SSS signals by the BS 412 is the same as the timing of transmission of PSS/SSS signals by the BS 418.

In one example embodiment, when the BS 412 and the BS 418 are different types of base stations within a LTE systems (e.g., one is FDD based and the other is TDD based), the transmission of PSS/SSS signals by BS 412 and BS 418 will be in different subframes. However, since the timings of the BS 412 and the BS 418 are synchronized, i.e., the radio frame time of the BS 412 and the BS 418 are the same, BS 412 and the BS 418 will be able to determine the timing at which the PSS/SSS signals are to be transmitted by another base station (or any of the other ones of the BSs 414 and 416 in the network 401) due to the fact that the transmission subframes of PSS/SSS signals in a radio frame for both LTE types (e.g., FDD and TDD) are known as will be described below.

AT S510, the BS 412 may receive from the UE 410 a desired duration of time that the UE 410 needs in order to successfully detect the PSS/SSS signals.

For FDD based communication between the BS 412 and the UE 410, the PSS/SSS are included in last two symbols of the first slot of subframes 0 and 5. Therefore, the search window or measurement gap length may be configured as short as 1 ms (first value), if the UE 410 is capable of completing radio frequency (RF) tuning from the BS 412 carrier frequency to the BS 418 carrier frequency and receiver preparation for performing the search for the PSS/SSS signal from the BS 418 within the time interval from the start of the PSS/SSS subframe to start of the PSS/SSS symbols in the PSS/SSS subframe (e.g., within a threshold). Accordingly, the BS 412 may receive a desired duration of 1 ms from the UE 410 for successfully detecting the PSS/SSS signals from the BS 418. Otherwise, the BS 412 may receive a desired duration of 2 ms (second value) from the UE 410.

For TDD based communication between the BS 412 and the UE 410, the PSS is included in the second symbols of the second slot of subframes 0 and 5, and the SSS is included in the last symbol of the first slot of subframes 0 and 5. Similar to the FDD based communication, search window or measurement gap length can be configured as short as 1 ms (first value), if the UE 410 is capable of completing RF tuning from the BS 412 carrier frequency to the BS 418 carrier frequency and receiver preparation for performing the search for the PSS/SSS signal from the BS 418 within the time interval from the start of the PSS/SSS subframe to start of the PSS/SSS symbols in the PSS/SSS subframe (e.g., within the threshold). Accordingly, the BS 412 may receive a desired duration of 1 ms from the UE 410 for successfully detecting the PSS/SSS signals from the BS 418. Otherwise, the BS 412 may receive a desired duration of 2 ms (second value) from the UE 410.

At S515, the BS 412 determines a timing of the measurement gap length for the UE 410 based on the determined timing of transmission of the PSS/SSS signals by the BS 418 and the desired duration of time received from the UE 410. Accordingly, BS 412 may determine the start time of the measurement gap length to be at the time that the BS 418 transmits the PSS/SSS signal (as determined at S505), where the length of the measurement gap length may be equal to the desired duration of time received from the UE 410 at S510.

Thereafter, at S520, the BS 412 instructs the UE 410 to start the search at the timing determined at S515 for a measurement gap length equal to the duration of time received at S510.

In performing the functions described above with reference to FIG. 5, the BS 412 (as well as any of the other BSs 414, 416 and 418), may be equipped with a memory and a processor. The memory may have computer-readable instructions stored therein. The processor is configured to execute the computer readable instructions stored on the memory, thus effectively converting the processor to a special-purpose processor that enables the BS 412 to perform the functions described above.

Similarly, the UE 410 may be equipped with a memory and a processor. The memory may have computer-readable instructions stored therein. The processor is configured to execute the computer readable instructions stored on the memory, thus effectively converting the processor to a special-purpose processor that enables the UE 410 to perform the functions described above.

As described above with reference to FIG. 5, determining the timing and the duration of the measurement gap length, results in a shorter duration of the measurement gap length compared to measurement gap lengths with which UEs are presently configured (e.g., measurement gap lengths of 1 ms or 2 ms compared to the current 6 ms). Consequently, the effect of the measurement gap length in interrupting the data transmission between UEs and their serving BSs may be reduced.

Figure 6:
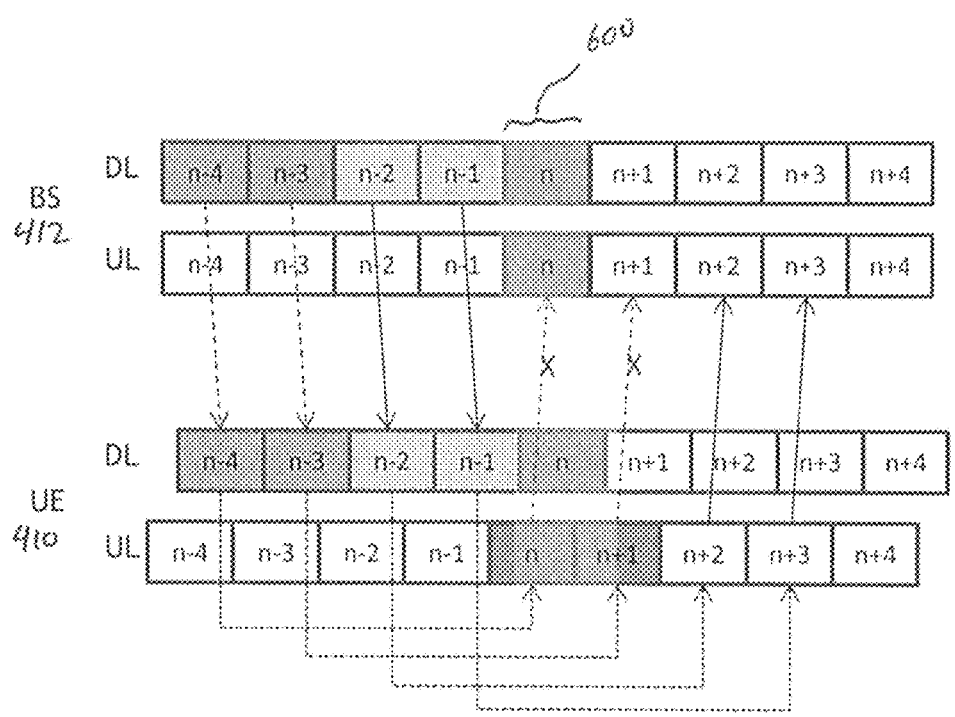
FIG. 6 illustrates the effective interruption in frequency division duplex (FDD) downlink data transmission between a user equipment and a base station, when the user equipment is configured with a measurement gap as described with respect to FIG. 5, according to one example embodiment.

FIG. 6 illustrates the effective interruption in frequency division duplex (FDD) downlink data transmission between a user equipment and a base station, when the user equipment is configured with a measurement gap as described with respect to FIG. 5, according to one example embodiment.

As shown in FIG. 6, an assumption is made that the measurement gap length 600, as determined by the BS 412, is 1 ms. A comparison between FIG. 6 and FIG. 1 described in the Background Section shows that because the measurement gap length is now 1 ms, the DL data transmission between the UE 410 and the BS 412 is interrupted in subframes n−4, n−3 and n instead of 10 subframes described with respect to FIG. 1 (interruption in data transmission is 3 ms in FIG. 6 compared to 10 ms in FIG. 1). Note that the data transmission interruption in the DL subframe n−3/UL subframe n+1 of the UE 410 is due to the offset between the DL and UL subframes of the UE 410 as shown in FIG. 6.

Figure 7:
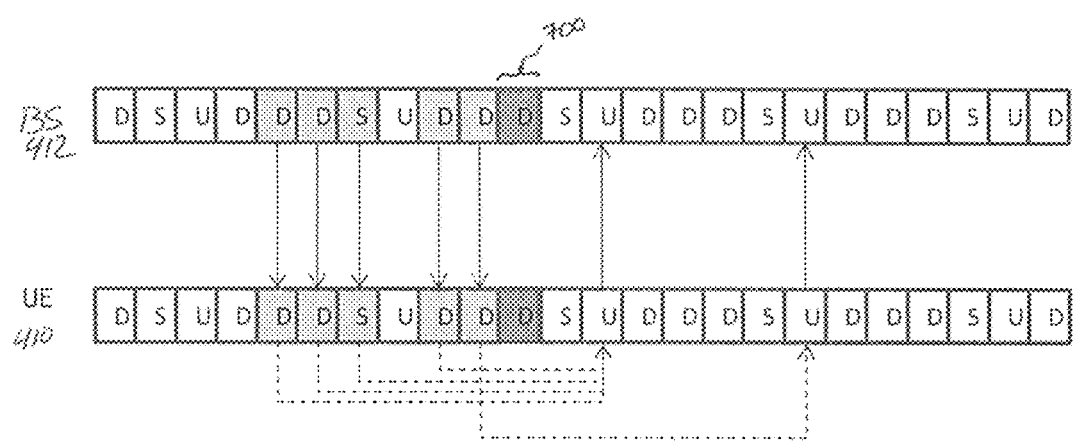
FIG. 7 illustrates the effective interruption in time division duplex (TDD) downlink data transmission between a user equipment and a base station, when the user equipment is configured with a measurement gap as described with respect to FIG. 5, according to one example embodiment.

FIG. 7 illustrates the effective interruption in time division duplex (TDD) downlink data transmission between a user equipment and a base station, when the user equipment is configured with a measurement gap as described with respect to FIG. 5, according to one example embodiment.

Figure 2:
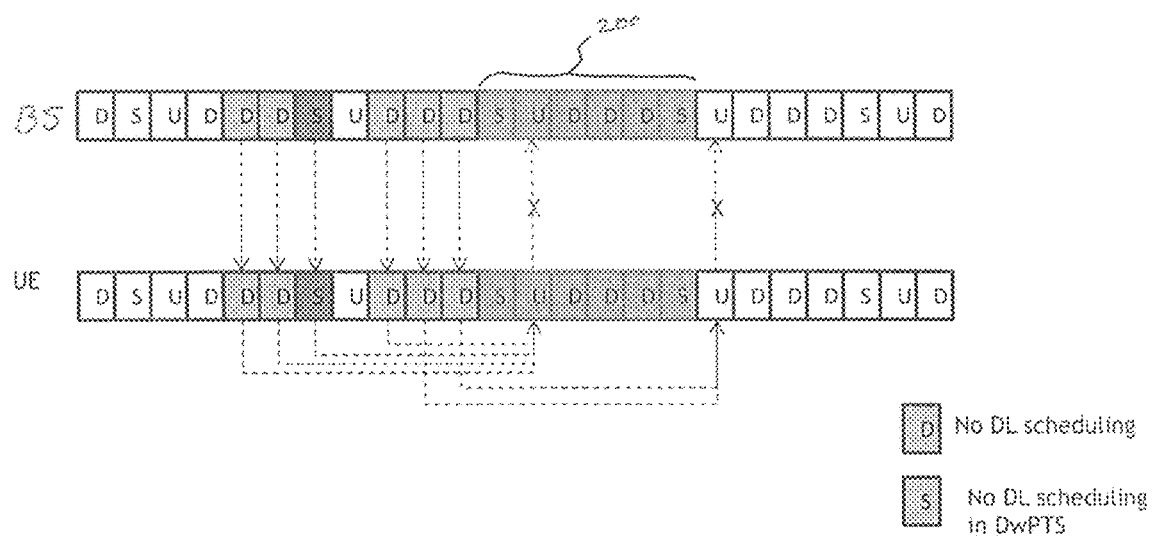
FIG. 2 illustrates the effective interruption in time division duplex (TDD) downlink data transmission between a user equipment and a base station, when the user equipment is configured with a fixed measurement pattern.

As shown in FIG. 7, an assumption is made that the measurement gap length 700, as determined by the BS 412, is 1 ms. A comparison between FIG. 7 and FIG. 2 described in the Background Section shows that because the measurement gap length is now 1 ms, the DL data transmission between the UE 410 and the BS 412 is interrupted in subframe n only instead of all DL subframes from n−7 to n+6 subframes described with respect to FIG. 2

Example embodiments being thus described, it will be obvious that the same may be varied in many ways. For example, specific numeral examples are used to designate the MGRPs, measurement gap lengths, etc., in order to describe the inventive concepts. However, the inventive concepts are not limited to the provided numerical examples. Such variations are not to be regarded as a departure from the spirit and scope of example embodiments, and all such modifications as would be obvious to one skilled in the art are intended to be included within the scope of the claims.

I claim:

1. A method comprising:
    determining, by a first device, a timing of a first synchronization signal and a second synchronization signal of a second device;
    receiving from a user equipment, a duration of time, the duration of time indicating an amount of time for the user equipment to perform radio frequency tuning and complete preparation for performing a search for the first and second synchronization signals;
    determining, by the first device, a timing of a measurement gap for the user equipment served by the first device based on the duration of time received from the user equipment, the measurement gap being a period of time during which the user equipment searches for the first and second synchronization signals; and
    instructing, by the first device, the user equipment to search for the first and second synchronization signals at the determined timing of the measurement gap, wherein
    in response to the duration of time meeting a first criteria, the determining the timing of the measurement gap is based on at least one of,
        i. at least two symbols of a first slot of a first subframe of a first data transmission and at least two symbols of a first slot of a second subframe of the first data transmission, or
        ii. a symbol of a first slot of a first subframe of a second data transmission, a symbol of a first slot of a second subframe of the second data transmission, a symbol of a second slot of the first subframe of the second data transmission, and a symbol of the second slot of the second subframe of the second data transmission.

2. The method of claim 1, wherein
the first criteria includes the duration of time being equal to a first value.

3. The method of claim 2, wherein
the first value is 1 ms.

4. The method of claim 1, wherein
the first device serves the user equipment on a first frequency channel that is different from a second frequency channel on which the second device is to transmit the first and second synchronization signals.

5. The method of claim 1, wherein the determining the timing of the first synchronization symbol and the second synchronization symbol determines the timing of the first synchronization signal and the second synchronization signal based on synchronized timing of the first device, the second device and the user equipment.

6. The method of claim 1, wherein no data transmission is performed between the user equipment and the second device during the measurement gap.

7. The method of claim 1, wherein the first synchronization signal is a primary synchronization signal (PSS) associated with the second device and the second synchronization signal is a secondary synchronization signal (SSS) associated with the second device.

8. The method of claim 1, wherein
the first data transmission is a frequency division duplexed data transmission,
the first subframe of the first data transmission is subframe 0, and
the second subframe of the first data transmission is subframe 5.

9. The method of claim 1, wherein
the second data transmission is a time division duplexed data transmission,
the first subframe of the second data transmission is subframe 0, and
the second subframe of the second data transmission is subframe 5.

10. A device comprising:
a memory including computer-readable instructions; and
a processor including hardware, the hardware configured to execute the computer-readable instructions to,
    determine a timing of a first synchronization signal and a second synchronization signal of an additional device,
    receive from a user equipment, a duration of time, the duration of time indicating an amount of time for the user equipment to perform radio frequency tuning and complete preparation for performing a search for the first and second synchronization signals,
    determine a timing of a measurement gap for the user equipment served by the device based on the duration of time received from the user equipment, the measurement gap being a period of time during which the user equipment searches for the first and second synchronization signals, and
    instruct the user equipment to search for the first and second synchronization signals at the determined timing of the measurement gap, wherein
    in response to the duration of time meeting a first criteria, the determining the timing of the measurement gap is based on at least one of,
        i. at least two symbols of a first slot of a first subframe of a first data transmission and at least two symbols of a first slot of a second subframe of the first data transmission, or
        ii. a symbol of a first slot of a first subframe of a second data transmission, a symbol of a first slot of a second subframe of the second data transmission, a symbol of a second slot of the first subframe of the second data transmission, and a symbol of the second slot of the second subframe of the second data transmission.

11. The device of claim 10, wherein
the first criteria includes the duration of time being equal to a first value.

12. The device of claim 11, wherein
the first value is 1 ms.

13. The device of claim 10, wherein
the device is a base station serving the user equipment on a first frequency channel, and
the additional device is an additional base station operating on a second frequency channel that is different from the first frequency channel.

14. The device of claim 10, wherein the device, the additional device and the user equipment are part of a synchronized LTE network.

15. The device of claim 10, wherein the execution of the computer-readable instructions by the processor, causes the processor to determine the timing of the first synchronization signal and the second synchronization signal based on synchronized timing of the device, the additional device, and the user equipment.

16. The device of claim 10, wherein the first synchronization signal is a primary synchronization signal (PSS) associated with the additional device and the second synchronization signal is a secondary synchronization signal (SSS) associated with the additional device.

17. The device of claim 10, wherein
the first data transmission is a frequency division duplexed data transmission,
the first subframe of the first data transmission is subframe 0, and
the second subframe of the first data transmission is subframe 5.

18. The device of claim 10, wherein
the second data transmission is a time division duplexed data transmission,
the first subframe of the second data transmission is subframe 0, and
the second subframe of the second data transmission is subframe 5.

19. A system comprising:
a user equipment;
a first device configured to transmit a first synchronization signal and a second synchronization signal; and
a second device serving the user equipment, the second device configured to,
determine a timing of the first synchronization signal and the second synchronization signal of the first device,
receive from the user equipment, a duration of time, the duration of time indicating an amount of time for the user equipment to perform radio frequency tuning and complete preparation for performing a search for the first and second synchronization signals,
determine a timing of a measurement gap for the user equipment based on the duration of time received from the user equipment, the measurement gap being a period of time during which the user equipment searches for the first and second synchronization signals, and
instruct the user equipment to search for the first and second synchronization signals at the determined timing of the measurement gap, wherein
in response to the duration of time meeting a first criteria, the determining the timing of the measurement gap is based on at least one of,
  i. at least two symbols of a first slot of a first subframe of a first data transmission and at least two symbols of a first slot of a second subframe of the first data transmission, or
  ii. a symbol of a first slot of a first subframe of a second data transmission, a symbol of a first slot of a second subframe of the second data transmission, a symbol of a second slot of the first subframe of the second data transmission, and a symbol of the second slot of the second subframe of the second data transmission.

20. The system of claim 19, wherein
the first data transmission is a frequency division duplexed data transmission,
the first subframe of the first data transmission is subframe 0,
the second subframe of the first data transmission is subframe 5,
the second data transmission is a time division duplexed data transmission,
the first subframe of the second data transmission is subframe 0, and
the second subframe of the second data transmission is subframe 5.

* * * * *